Patented Dec. 6, 1949

2,490,605

UNITED STATES PATENT OFFICE 2,490,605

DIAZOTYPE LIGHT-SENSITIVE LAYERS CONTAINING 4-BROMORESORCINOL

William H. von Glahn, Loudonville, and Lester N. Stanley, Delmar, N. Y., assignors to General Aniline & Film Corporation, New York, N. Y., a corporation of Delaware No Drawing. Application May 24, 1946, Serial No. 672,167

4 Claims. (Cl. 95—6)

This invention relates to a diazotype process and more particularly to the use of certain azo components in the light-sensitive layer or as developers for the diazotype image.

In the reproduction of mechanical drawings, printed material, pictures or other originals to be copied, it is of particular advantage in any case to first make an intermediate print or transition print on a transparent or semi-transparent diazo copying material and use this intermediate or transition print as an original for the reproducton of further copies. The intermediate print is obtained by exposing a transparent or semi-transparent sensitized diazotype material to actinic rays by either the printing-through or reflex process and then developing the exposed diazotype material either by contact with gaseous ammonia as in the case of a two-component diazotype or by treatment with an alkaline solution of the coupling component as in the case of the one-component or so-called wet development diazotype process. The use of intermediate or transition prints as originals in the reproduction of further copies is of particular value when it is desired to make a large number of reproductions from a frail or valuable original which would be adversely affected, if not destroyed, in the repeated exposures necessary to make the desired number of copies. It is not only useful but necessary to make such a transition print when an original to be copied is opaque and can only be copied on a diazotype layer by reflex exposure.

The efficiency of transition prints depends upon the covering power or opacity to ultraviolet light of the azo dye image produced on the image and the transparency of the background areas. The latter property, in turn, depends upon the stability in the case of two-component coatings against premature coupling of the diazo and azo component. To a lesser but nevertheless considerable degree, the efficiency of transition prints also depends upon the visual density of the image produced since images of poor visual density such as a yellow image on a white or transparent background, which may satisfy the requirements of opacity to ultraviolet light and transparency of the background, nevertheless have the disadvantage of rendering difficult the detection of flaws in the intermediate image and it is often necessary to make a test print from the transition print of deeper contrast than the transition print before such flaws can be detected.

Many types of azo dyestuff coupling components are known to the diazotype art for the production of prints of a deep color which have good visual density. Most common of such azo components is phloroglucin. However, despite the density of the color reproducing the image, when using such azo components the actinic opacity or photographic density is not sufficient to reproduce the image satisfactorily in subsequent diazotype copies. It has been found that azo dye components used for the production of images on prints which are to be used as intermediate or transition prints must be such as to produce with the diazo compound employed a yellow to brown azo dye which will sufficiently absorb ultraviolet light to prevent light decomposition of the diazo compound or other light-sensitive medium in the image areas of the reproduction medium used to make further copies from the transition print.

Resorcinol has been suggested and has been extensively used in the production of diazotype light-sensitive layers for transition prints and it has been found that resorcinol will produce sepia and brown color images having the desired light absorption characteristics for transition printing. While resorcinol will produce the image on the transition print in azo dye colors having good opacity to ultraviolet light and having sufficient visual density to assure detection of printing flaws, nevertheless the precoupling stability of diazotype layers containing resorcinol is not sufficient to assure prolonged storage before use. Carriers such as transparentized paper or film having thereon a light-sensitive layer composed of the usual diazo compounds and additional components with resorcinol as the coupling component gradually develop discoloration prior to use, which discoloration is produced by spontaneous coupling of the resorcinol and diazo compound. This discoloration will, of course, be retained by the transition print and will be present in background areas as well as in the image areas, thus impairing the ability of the background areas to efficiently transmit actinic light. Consequently the light-sensitive diazo compounds or other light-sensitive media in the reproduction material employed for making further copies from the transition print will not be efficiently decomposed in the background areas. The discoloration appearing in the background area of the transition print will therefore be reproduced in the final copies, diminishing the contrast between the background and the image in such final copies.

It has now been found that a new class of azo dye coupling components not heretofore used in diazotype reproduction media may be employed in a light-sensitive layer with a suitable diazo compound on a carrier such as transparentized paper or film to produce a diazotype which upon exposure and development will reproduce the image of the original in a dark sepia color having high acitinic opacity, a high degree of transparency of the background area and good visual density. This class of azo dye coupling components includes those halogen derivatives of resorcinol wherein a bromine, iodine or fluorine atom is substituted on the 4 position of the resorcinol radical and there are no other substitutions on the ring. These compounds may be represented by the following general formula

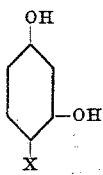

wherein X is a halogen of the group consisting of Br, I and F.

Examples of compounds of this class are 4-bromoresorcinol, 4-iodoresorcinol and 4-fluororesorcinol. When using such compounds together with the diazo compound in a two-component diazo light-sensitive coating, a product is obtained which has a high degree of stability against precoupling under average conditions of temperature and humidity encountered during prolonged storage and also under the conditions of accelerated aging tests. It is thus possible, after a prolonged period of storage necessary for successful commercial distribution of the product, to make transition prints which will have a colorless background of good actinic transparency. In this respect the transition prints made from this class of azo dye components will be superior to similar prints made of coatings having unsubstituted resorcinol as the azo dye component. The images produced will also have better covering power or opacity to ultraviolet light, better light and wash fastness and better visual density or appearance than print made from similar light-sensitive layers containing unsubstituted resorcinol. The reprint qualities of the transition prints made from the light-sensitive layers containing the mono halogen resorsinol azo dye components of this invention are excellent in view of these superior properties and are therefore eminently suited for transition prints in the reproduction of further copies. It was not to be expected that the particular mono halogen resorcinol derivatives of this invention would be so well suited for the production of light-sensitive layers intended for transition prints since not only does the unsubstituted resorcinol fail to have the necessary properties for efficient transition printing but also isomeric halogen derivatives of resorcinol such as 2-bromoresorcinol, 4-chloro and 4,6-dichlororesorcinol and other dihalogen resorcinols fail to measure up to efficient standards. For instance, in comparison with 2-bromo derivatives, the 4-halogen derivatives of this invention possess a much higher degree of stability against precoupling and produce images having a much higher degree of opacity to ultraviolet light. As compared with the mono and dichloro resorcinol derivatives, the azo dye components of this invention produce dye images having a far superior opacity. The dibromo and diodo derivatives of resorcinol have inferior developing powers and the dihalogen resorcinols in general are quite unstable in comparison with the mono halogen resorcinols of this invention and particularly in the case of the diodo resorcinol decomposition takes place on storage which produces a discoloration in addition to that which is produced by coupling instability. These decomposition products also absorb light in the ultraviolet range and also prevent the bleaching out of the diazo or decomposition of other light-sensitive media in the reproduction media employed for making copies from the transition prints.

In the preparation of diazotype layers intended for use as intermediate or transition print media in accordance with this invention, a suitable transparent base such as transparentized paper, cellulose acetate film or other transparent material is coated by means known to the art with a light-sensitive composition containing suitable diazo compounds in combination with such other materials as are ordinarily used in the preparation of diazotype compositions. Where a two-component layer is desired, the mono halogen resorcinol azo dye components of the class 4-bromoresorcinol, 4-iodoresorcinol and 4-fluororesorcinol are added to the light-sensitive coating solution. As diazo compounds, we prefer to use those which are derived from p-diamines of the benzene series, particularly those in which at least one of the hydrogens of one amino group is substituted by such groups as alkyl, alkoxy alkyl, aryl, aralkyl, alkylol, cycloaliphatic, and heterocyclic groups. However, other diazo compounds have been found suitable such as diazo anhydrides of aminohydroxynaphthalene compounds. These diazo compounds may be used in the form of their zinc chloride, cadmium chloride, tin chloride double salts, fluorborate and aryl and alkyl sulfonate complexes. Examples of amines from which typically diazo compounds are derived include: N-hydroxy ethyl-N-methyl-amino p-amino benzene, p-amino diphenylamine, 1-monoethylamino-2-(or 3-)methyl-4-amino benzene, 1-N-hydroxyethyl-N-ethyl-amino-3-methyl-4-amino benzene, 1-N,N-diethylamino-3-ethoxy-4-amino benzene, 4-amino-1-N-benzoylamino-2.5-diethoxy (or dimethoxy) benzene, p-amino-N-diethylaniline, 1-N,N-dihydroxy-ethyl-amino-3-chloro-4-amino benzene, p-amino-N-ethyl-N-benzylaniline, p-amino-N,N-dimethylaniline, 1-ethylamino-4-amino-benzene, 1-N,N-hydroxy-ethyl-ethyl-amino-4-amino benzene, p-phenylene diamine, 4-amino-N,N-dioxy-alkylaniline and 4'-ethoxyphenyl-2.5-diethoxy-aniline.

The light-sensitive layers may be produced by any of the several methods employed in diazotype practice. For example, the azo dye coupling components of this invention may be applied to the transparent or semi-transparent carrier as part of a coating solution together with a stabilized diazo compound or the azo dye coupling component may be rubbed on to the light-sensitized surface in a powdered form before or after application of the diazo solution. A sensitized layer on the transparent or semi-transparent carrier surface may also be applied containing as the only dye component the light-sensitive diazo compound in which case the azo dye coupling components of this invention will be applied by the so-called wet development process after the light-sensitized surface has been exposed.

In any of these methods, the coating solution which is applied to the carrier surface may be sprayed on and dried or may be applied by a dip method as in the case of acetate film carriers or by drawing the surface to be sensitized past a trough held against the carrier surface by a doctor blade which doctors off the excess coating solution.

To further illustrate this invention, the following examples are given, it being understood that no limitations are intended either as to proportions or to the specific materials employed in said examples. Unless otherwise stated, the parts are by weight.

*Example 1*

A transparentized paper is coated with a solution of the following materials per 100 cc. of water:

3.4 grams of 4-bromoresorcinol
4 grams N-ethylaniline-p-diazo-$ZnCl_2$ double salt
8 grams citric acid
1.5 cc. phosphoric acid
5 cc. isopropanol
4 grams thiourea The coatings thus obtained after the usual drying operation were submitted to accelerated aging tests and found to be more stable to precoupling under the conditions of such tests than similar coatings using resorcinol. After exposure to light under an original pattern and developing the image with ammonia fumes, the pattern of the original is reproduced in a dark sepia shade having better visual density, greater opacity to ultraviolet light and better light and wash fastness than similar prints made from coatings containing resorcinol as the azo dye component. Upon using the prints thus made from the coatings of this example as originals for reprinting on ordinary diazotype media, reprints were obtained having excellent line density and no background discoloration.

*Example 2*

Transparentized paper is coated with a coating solution containing the following material per 100 cc. of water:

3.4 grams 4-bromoresorcinol
4 grams N-ethyl-o-toluidine-p-diazo $ZnCl_2$ double salt
8 grams citric acid
1.5 cc. phosphoric acid
1.5 cc. isopropanol
4 grams thiourea The coatings thus produced are dried in the usual manner and upon being submitted to accelerated aging tests prove to be more stable to precoupling than similar coatings made with resorcinol as the coupling component. After exposure to light under an original pattern and development with ammonia fumes, a print of the original pattern is obtained in a dark sepia image which has better visual density, a higher degree of opacity to ultraviolet light and better light and wash fastness than a similar print obtained from light-sensitive coatings using resorcinol as the coupling component. Upon using the print obtained in accordance with this example as a transition or intermediate print for the reproduction of further copies of the diazotype intermediate, copies are obtained which have excellent line density and no background discoloration.

*Example 3*

A transparentized paper support is coated with a coating solution containing the following materials per 100 cc. of water:

3.4 grams 4-bromoresorcinol
4.8 grams N-methyl, N-hydroxyethyl aniline-p-diazo $ZnCl_2$ double salt
8 grams citric acid
1.5 cc. phosphoric acid
5 cc. isopropanol
4 grams thiourea The coated transparency thus obtained is dried in the usual manner and subjected to accelerated aging tests in comparison with similar coatings obtained when using resorcinol as the coupling component. It is found that the coatings obtained in accordance with this example are more stable to precoupling than the coatings obtained from resorcinol. Upon exposing the coatings of this example to light under an original pattern and developing with ammonia fumes, a reproduction of the original pattern is obtained in a sepia color of somewhat lighter shade than that of the preceding examples. This image, however, has good visual density which is better than that obtained from the resorcinol prints. It also has a greater degree of opacity to ultraviolet light and better light and wash fastness than the resorcinol prints. Upon using the prints obtained in accordance with this example as transition or intermediate prints for the reproduction of further diazotype copies, reproductions are obtained which have better visual density and clearer backgrounds than those obtained from resorcinol prints.

*Example 4*

A transparentized paper is coated with a coating solution containing the following materials per 100 cc. of water:

5 grams 4-iodoresorcinol
4 grams N-ethylaniline-p-diazo $CdCl_2$ double salt
8 grams citric acid
1.5 cc. phosphoric acid
5 cc. isopropanol
4 grams thiourea The coated transparency obtained from this coating solution is dried in the usual manner and submitted to accelerated aging tests. Under the conditions of such tests, it is found that the precoupling stability of these coatings is superior to that of coatings obtained when using resorcinol as the coupling component. Upon exposing the coatings of this example to light under an original pattern, a print is obtained of a dark sepia image which has better visual density than similar prints obtained from resorcinol and better light and wash fastness than the resorcinol prints. The opacity to ultraviolet light of these images is better than that of resorcinol but slightly less than that of the 4-bromoresorcinol of the preceding examples. The prints made from the light-sensitive layers of this example may be used as transition or intermediate prints for the reproduction of further diazotype copies which latter will have good visual density and clear backgrounds due to the good opacity of the transition prints and the stability of the original coatings.

Upon substituting 4.8 grams N-methyl, N-hydroxethyl aniline-p-diazo $ZnCl_2$ double salt for the 4 grams N-ethyl aniline-p-diazo $CdCl_2$ double salt used in the coating formula of this example, light-sensitized transparencies having the same good properties of visual density, opacity to ultraviolet light and wash and light fastness will be obtained.

Example 5

A transparentized paper is coated with a solution containing the following materials per 100 cc. of water:

3.4 grams 4-bromoresorcinol
4.5 grams N-phenyl aniline-p-diazonium acid sulfate
8 grams citric acid
1.5 cc. phosphoric acid
.5 cc. isopropanol
4 grams thiourea The coated transparency obtained from this coating solution is dried in the usual manner and subjected to accelerated aging tests. Under the conditions of these tests and upon comparison with similar coatings using resorcinol as the coupling component, it is found that the coatings of this example are more stable to precoupling than the resorcinol couplings. Upon exposing the coatings of this example to light under an original pattern and developing same with ammonia fumes, a reproduction of the original pattern is obtained in a dark sepia color which has better visual density, better opacity to ultraviolet light and better light and wash fastness than similar prints made from the resorcinol coatings. Upon using the prints made from the coated transparencies of this example as transition prints for the reproduction of further diazotype copies, reproductions are obtained having good visual density and clear backgrounds.

On substituting 5 grams of the diazo anhydride derived from 2-amino-1-hydroxy-5-naphthalene sulfonic acid for the N-phenyl aniline-p-diazonium acid sulfate of this example, the diazotype transparencies having the same good properties of visual density, opacity to ultraviolet light, better light and wash fastness are obtained.

Example 6

A transparentized paper is coated with a coating solution containing the following materials per 100 cc. of water:

5 grams 4-iodoresorcinol
5 grams diazo anhydride derived from 2-amino-1-hydroxy-5-naphthalene sulfonic acid
8 grams citric acid
1.5 cc. phosphoric acid
5 cc. isopropanol
4 grams thiourea The coated transparency obtained from this coating solution is dried in the usual manner and subjected to accelerated aging tests in comparison with similar coatings using resorcinol as the coupling component. Under the conditions of such tests, it is found that the coatings of this example are more stable to pre-coupling than the coatings obtained from resorcinol. Upon exposure of transparencies obtained in accordance with this example to light under an original pattern and developing with ammonia fumes, reproductions of the pattern are obtained in a dark sepia color which have the same properties as the prints obtained similarly in accordance with Example 4. Upon using these prints as transition or intermediate prints for the production of further diazotype copies, reproductions are obtained in images of good visual density against clear backgrounds.

Example 7

A transparentized paper is coated with a coating solution containing the following materials per 100 cc. of water:

3.6 grams 4-fluororesorcinol
4 grams N-ethyl aniline-p-diazo $CdCl_2$ double salt
8 grams citric acid
1.5 cc. phosphoric acid
5 cc. isopropanol
4 grams thiourea The coated transparency obtained from this coating solution is dried in the usual manner and subjected to accelerated aging tests in comparison with transparencies having similar coatings using resorcinol as the coupling component instead of 4-fluororesorcinol. Under the conditions of such aging tests the coatings of this example are found to be more stable to precoupling than the resorcinol coatings. Upon using the transparencies obtained in accordance with this example for the reproduction of an original pattern by exposure to light and development with ammonia fumes, a print is obtained in a deep sepia color having the same properties of visual density, opacity to ultraviolet light, light and wash fastness, as are obtained from the coatings of example 4 and upon using these reproductions as transition prints for the production of further diazotype copies using ordinary diazotype coatings as the copy media, the original pattern is obtained in images having good visual density on clear backgrounds.

Example 8

A transparentized paper is coated with a coating solution containing the following materials per 100 cc. of water:

3.4 grams 4-bromoresorcinol
4.3 grams N-ethyl, N-hydroxy ethyl-m-toluidine-p-diazo $ZnCl_2$ double salt
8 grams citric acid
1.5 cc. phosphoric acid
5 cc. isopropanol
4 grams thiourea The transparency coated with the coating solution of this example is dried in the usual manner and submitted to accelerated aging tests in comparison with similar coatings made from a solution containing resorcinol as the coupling component. Under the conditions of such aging tests, the coatings of this example are found to be more stable to precoupling than the resorcinol coatings. Upon exposure of these coatings to light under an original pattern and development of the image with ammonia fumes, a print is obtained reproducing the original pattern in a dark sepia color which has better visual density, a greater degree of opacity to ultraviolet light and better light and wash fastness than prints made from the similar coatings containing resorcinol as the coupling component. Upon using the prints obtained from the coating of this example as transition prints for the reproduction of further diazotype copies, using ordinary diazotype media as the reproduction material, copies are obtained reproducing the original pattern in images of good visual density against clear backgrounds.

We claim:

1. As a new product a light-sensitive layer on a suitable base comprising a diazo derivative of a p-diamino compound of the benzene series and 4-bromoresorcinol.

2. As a new product a light-sensitive layer on a suitable base comprising as the diazo compound N-ethyl, N-hydroxyethyl-m-toluidine-p-diazo $ZnCl_2$ double salt and as the coupling component 4-bromoresorcinol.

3. As a new product a light-sensitive layer on a suitable base comprising the diazo compound N-hydroxyethyl, N-methyl aniline-p-diazo $ZnCl_2$ double salt and as the coupling component 4-bromoresorcinol.

4. As a new product a light-sensitive layer on a suitable base comprising as the diazo compound N-ethyl aniline-p-diazo $ZnCl_2$ double salt and as the coupling component 4-bromoresorcinol.

WILLIAM H. von GLAHN.
LESTER N. STANLEY.

REFERENCES CITED

The following references are of record in the file of this patent:

UNITED STATES PATENTS

| Number | Name | Date |
|---|---|---|
| 1,853,462 | Schmidt | Apr. 12, 1932 |
| 2,286,656 | Sus | June 16, 1942 |
| 2,298,444 | Weissberger | Oct. 13, 1942 |